(12) United States Patent
Yano et al.

(10) Patent No.: US 9,732,984 B2
(45) Date of Patent: Aug. 15, 2017

(54) CONTROL APPARATUS FOR WATER HEATER

(71) Applicant: NORITZ CORPORATION, Hyogo (JP)

(72) Inventors: Yuiko Yano, Hyogo (JP); Shinichi Okamoto, Hyogo (JP)

(73) Assignee: Noritz Corporation (JP)

(*) Notice: Subject to any disclaimer, the term of this patent is extended or adjusted under 35 U.S.C. 154(b) by 457 days.

(21) Appl. No.: 14/067,539

(22) Filed: Oct. 30, 2013

(65) Prior Publication Data

US 2014/0116357 A1    May 1, 2014

(30) Foreign Application Priority Data

Oct. 31, 2012 (JP) ................................. 2012-240016

(51) Int. Cl.
*F24H 9/20* (2006.01)
*F24H 1/12* (2006.01)
(Continued)

(52) U.S. Cl.
CPC ....... *F24H 9/2035* (2013.01); *F24D 19/0095* (2013.01); *F24H 1/124* (2013.01);
(Continued)

(58) Field of Classification Search
USPC ................................................. 122/14.2, 40
See application file for complete search history.

(56) References Cited

U.S. PATENT DOCUMENTS

| 4,921,163 A * | 5/1990 | Viessmann ........ G05D 23/1917 236/46 R |
| 6,606,968 B2 * | 8/2003 | Iwama et al. ................ 122/18.1 |

(Continued)

FOREIGN PATENT DOCUMENTS

| EP | 2151635 A2 | 2/2010 |
| JP | 2006-207903 A | 8/2006 |

(Continued)

OTHER PUBLICATIONS

Extended search report issued in European Application No. 13189722.5, dated Mar. 7, 2014.

*Primary Examiner* — Alissa Tompkins
*Assistant Examiner* — Nathaniel Herzfeld
(74) *Attorney, Agent, or Firm* — Fishman Stewart PLLC

(57) ABSTRACT

The present invention becomes possible to employ a main microprocessor with a relatively lower number of input ports, whereby while maintaining the performance and function of a water heater, the cost of a control apparatus is cut down. Some of sensors, adapted for measurement of various parameters which are for use in operational control of the water heater and in need of immediate response, are connected to a main microprocessor 31. The other sensors that are not in need of an immediate response, such as an ambient temperature sensor 36, are connected only to a sub microprocessor 32 if the main microprocessor 31 does not have any extra analog signal input port. The sub microprocessor converts an analog signal from the sensor 36 which is connected only to the sub microprocessor into digital data. And the sub microprocessor transmits the digital data to the main microprocessor through communication therewith.

11 Claims, 1 Drawing Sheet

(51) Int. Cl.
*F24D 19/00* (2006.01)
*G05B 19/042* (2006.01)
*F24H 8/00* (2006.01)

(52) U.S. Cl.
CPC ......... *F24H 8/006* (2013.01); *G05B 19/0421* (2013.01); *Y02B 30/106* (2013.01); *Y02B 30/762* (2013.01)

(56) References Cited

U.S. PATENT DOCUMENTS

| | | | | |
|---|---|---|---|---|
| 7,322,532 | B2 * | 1/2008 | Takada | F24H 9/2035 122/14.2 |
| 7,597,066 | B2 * | 10/2009 | Shimada et al. | 122/18.1 |
| 2005/0278040 | A1 * | 12/2005 | Itoh | G05B 15/02 700/11 |
| 2008/0092826 | A1 * | 4/2008 | Kishimoto | F23N 5/242 122/14.1 |
| 2010/0024449 | A1 * | 2/2010 | Hwang | F24D 11/0214 62/113 |
| 2010/0082134 | A1 * | 4/2010 | Phillips et al. | 700/90 |
| 2012/0090341 | A1 * | 4/2012 | Hatada et al. | 62/238.7 |

FOREIGN PATENT DOCUMENTS

| | | | | |
|---|---|---|---|---|
| JP | 2006-220349 | A | 8/2006 | |
| JP | 2007-322004 | A | 12/2007 | |
| JP | 2010-261686 | A | 11/2010 | |
| KR | EP 2151635 | A2 * | 2/2010 | ......... F24D 11/0214 |
| WO | WO-2006/080223 | A1 | 8/2006 | |

\* cited by examiner

CONTROL APPARATUS FOR WATER HEATER

TECHNICAL FIELD

The present invention relates to a control apparatus for a water heater.

BACKGROUND ART

A typical conventional control apparatus for use with a water heater is provided with a microprocessor as its central control section. The microprocessor controls operations on various actuators including a gas solenoid valve for switching of the supply of fuel gas between ON and OFF states, a proportional valve for regulation of the supply amount of fuel gas, a fan motor for regulation of the supply amount of combustion air, a water flow rate control valve for regulation of the supply amount of hot water and other like actuating means.

PCT Publication No. WO 2006/080223 is intended for achieving improvement in safety of the operational control of such a water-heater control apparatus, and it discloses a control apparatus which has a main microprocessor and a sub microprocessor whose performance is lower than that of the main microprocessor. In the water-heater control apparatus, the detection signals from all of sensors are fed to both of these microprocessors. In this control apparatus, the main microprocessor executes control to supply hot water by the water heater, whereas the sub microprocessor executes control urgently to shut off fuel supply in stop conditions less severe as compared to the main microprocessor. In addition, generally, a microprocessor is equipped with analog signal input ports at which analog detection signals from various sensors are input, communication ports for establishing intercommunication with the other microprocessors and output ports from which control signals are output to various actuators.

In addition, for example, as disclosed in the JP-A-2007-322004, this type of water heater has a built-in freeze prevention heater for freeze prevention, and the control apparatus controls the heater for freeze prevention. Such freeze prevention control is achieved based on the detection signal from a specific temperature sensor adapted for measurement of the ambient temperature (e.g. the outside air temperature or the temperature of the inner space of the water heater), the combustion casing temperature or other like temperature.

SUMMARY OF INVENTION

Technical Problem

In the case that such freeze prevention control is executed by the control apparatus disclosed in said PCT Publication No. WO 2006/080223, it is required that the sensor such as an ambient temperature sensor should feed an analog detection signal for use in freeze prevention control to the analog signal input port of the main microprocessor. However, the main microprocessor is limited in the number of analog signal input ports (for example, eight ports for the case of a microprocessor with a total of 64 pins). In addition, in order to meet the demand for cost reduction from the market, if more inexpensive microprocessors are employed, this will result in further limiting the number of analog signal input ports of the microprocessor. Consequently, all of the analog signal input ports are occupied by the various sensors adapted for basic hot-water supply control operations, and it becomes impossible to input an analog detections signal from the sensor such as an ambient temperature sensor for freeze prevention control to the main microprocessor.

On the other hand, when compared to the parameters for use in hot-water supply control operations (i.e., the temperature of hot water, the state of combustion, the speed of rotation of the fan motor and other like parameter), the ambient temperature which is detected by the ambient temperature sensor varies slowly according to the variation in sunshine condition or according to the variation in weather. Therefore, unlike the hot-water supply control, immediate responsiveness is not required in the freeze prevention control executed based on the ambient temperature.

Therefore, the technical problem to be solved with respect to the conventional hot-water control apparatus is to achieve improvement in the route through which the detection values from the sensors adapted for measurement of parameters of non-immediate responsiveness (i.e., parameters which are not in need of an immediate response) are input to a main microprocessor, whereby to allow for employment of a main microprocessor with a relatively low number of input ports so that the cost of the control apparatus is cut down while maintaining the performance and function of the water heater.

Solution to Problem

The present invention relates to a control apparatus for a water heater. The control apparatus has a plurality of sensors for measurement of various parameters for operational control on said water heater. The apparatus further has a controller for controlling said water heater upon analog detection signals output from said plural sensors. The controller includes a primary microprocessor with analog signal input ports and a secondary microprocessor with at least one analog signal input port, the secondary microprocessor being intercommunicable with said primary microprocessor. And, the water-heater control apparatus according to the present invention has the following characteristic features.

In the present invention, at least one of the plural sensors serves to measure a non-immediate responsive parameter that is not in need of immediate response by said controller. The sensor adapted for measurement of the non-immediate responsive parameter outputs the analog detection signal which is not input to any analog signal input ports of the primary microprocessor, but is input only to the analog signal input port of the secondary microprocessor. The others of the plural sensors output the analog detection signals which are input at least to the analog signal input ports of the primary microprocessor. The secondary microprocessor is configured to convert the analog detection signal input only to the analog signal input port thereof into digital data and to transmit the digital data to the primary microprocessor through communication with the primary microprocessor.

According to the water-heater control apparatus, the primary microprocessor, into which the analog detection signals from other than the aforesaid one sensor adapted for measurement of a non-immediate responsive parameter are input directly via the analog signal input ports thereof, controls various operations in need of an immediate response based on these detection signals. On the other hand, the secondary microprocessor is connected to the aforesaid one sensor adapted for non-immediate responsive parameter measurement, and the analog detection signal from the aforesaid one sensor is input at the analog signal input port of the secondary microprocessor. Since no analog detection signal from the aforesaid one sensor is input to any analog signal input port of the primary microprocessor, this makes it possible to reduce the number of analog signal input ports of the primary microprocessor, whereby as the primary microprocessor, an inexpensive primary microprocessor can be employed thereby achieving reduction in product cost. On the other hand, the analog detection signals input at the analog signal input port of the secondary microprocessor are converted into digital data in the secondary microprocessor, thereafter being transmitted, as digital data (in the form of signals relating to the digital data) to the primary microprocessor through communication with the primary microprocessor so that they can be used as data for use in various control operations in the primary microprocessor. Such intercommunication between the primary microprocessor and the secondary microprocessor is established by periodical communication made at intervals in the range from several hundreds of milliseconds to several seconds, and without application of an excessive load to each microprocessor, it is possible to transmit digital data corresponding to the analog detection signals input only to the secondary microprocessor to the primary microprocessor. Even in this case, the water heater is not reduced in its performance and functionality, since the analog detection signals fed to the secondary microprocessor are for measurement of non-immediate responsive parameters which are not in need of an immediate response.

In addition, similar to the control apparatus described in WO 2006/080223, it may be possible to employ such a configuration that the analog detection signals of the sensors which are fed to the primary microprocessor are also fed in parallel to the analog signal input ports of the secondary microprocessor, and further it may be configured such that the secondary microprocessor independently executes an urgent interrupt operation in a stop condition less severe or equal to the control condition in the primary microprocessor. Furthermore, in this case, it may be configured such that based on the analog detection signals fed to both of the primary microprocessor and the secondary microprocessor, the decision of whether each signal value is abnormal or not is made. To sum up, in the secondary microprocessor, the analog detection signal fed thereto is converted into digital data, and the digital data is transmitted to the primary microprocessor through communication with the primary microprocessor, while in the primary microprocessor, there is made a comparison between the digital data converted from the aforesaid analog detection signal fed at its analog signal input port and the digital data transmitted from the second microprocessor so that the decision of whether each signal value is normal is made.

In the water-heater control apparatus, the primary microprocessor and the secondary microprocessor may be configured to perform an intercommunication normality verifying process at least when power is turned on which verify whether the intercommunication between the primary microprocessor and the secondary microprocessor is normal. The secondary microprocessor may be configured to start transmission of the digital data from the secondary microprocessor to the primary microprocessor after the intercommunication is verified to be normal by the intercommunication normality verifying process. And, the primary microprocessor may be configured to control a predetermined operation based on the digital data received through communication with the secondary microprocessor. According to this configuration, it is not until the intercommunication between the primary microprocessor and the secondary microprocessor is verified to be normal intercommunication by the intercommunication normality verifying process that a predetermined control operation is performed based on the digital data transmitted from the secondary microprocessor to the primary microprocessor, and after the intercommunication between the primary microprocessor and the secondary microprocessor is verified to be normal intercommunication, the predetermined control operation is carried out based on the digital data received through communication with the secondary microprocessor, whereby even if when power is turned on, the default of the volatile memory in the microprocessor that stores digital data indicates an abnormal value to serve as a control parameter, it is possible to avoid execution of a predetermined control operation based on such an abnormal value.

In addition, in the water-heater control apparatus, it is possible to employ, as an at least one sensor for measurement of the aforesaid non-immediate responsive parameter, an ambient temperature sensor. This ambient temperature sensor may be either a thermistor disposed in the internal space (housing internal space) of the water heater or an outside air temperature sensor adapted for detection of the temperature of air outside the water heater.

In addition, in the water-heater control apparatus, the primary microprocessor may be configured to control a predetermined hot water supply operation and a predetermined freeze prevention operation. At least some of said sensors may serve to measure an immediate responsive parameters that are in need of immediate response by said controller for controlling said hot water supply operation. All of said analog detection signals from said some sensors may be input into said analog signal input ports of said primary microprocessor. The non-immediate responsive parameter may be used for controlling said freeze prevention operation. According to this configuration, the analog detection signals from all of the sensors for measurement of parameters which are in need of an immediate response and necessary for control of the hot-water supply are input to the primary microprocessor, whereby based on these analog detection signals, hot-water supply control in need of a more immediate response, such as control of the position of a gas proportional valve adapted for adjustment of the combustion capacity of a combustor, control of the closing of a main gas solenoid valve for execution of an urgent interrupt operation or control of the speed of rotation of a combustion fan for achieving an optimum combustion state, can be achieved promptly and adequately. On the other hand, the analog signal from the sensor that measures a parameter which is not in need of an immediate response but necessary for execution of the freeze prevention control is input only at the analog signal input port of the secondary microprocessor. Even in this case, no problems are caused even if the response speed of the non-immediate responsive parameter is extremely slower relative to the response speed required for execution of the hot-water supply control, and by transmission of the non-immediate responsive parameter as digital data from the secondary microprocessor to the primary microprocessor at the time of periodical intercommunication between the primary microprocessor and the secondary microprocessor, the primary microprocessor can utilize the digital data as a freeze prevention control parameter.

Finally, if a water heater is so configured as to include a control apparatus of the type as described above, this makes it possible for the water heater to achieve the foregoing advantageous operation/working effects.

DESCRIPTION OF EMBODIMENTS

Figure 1:
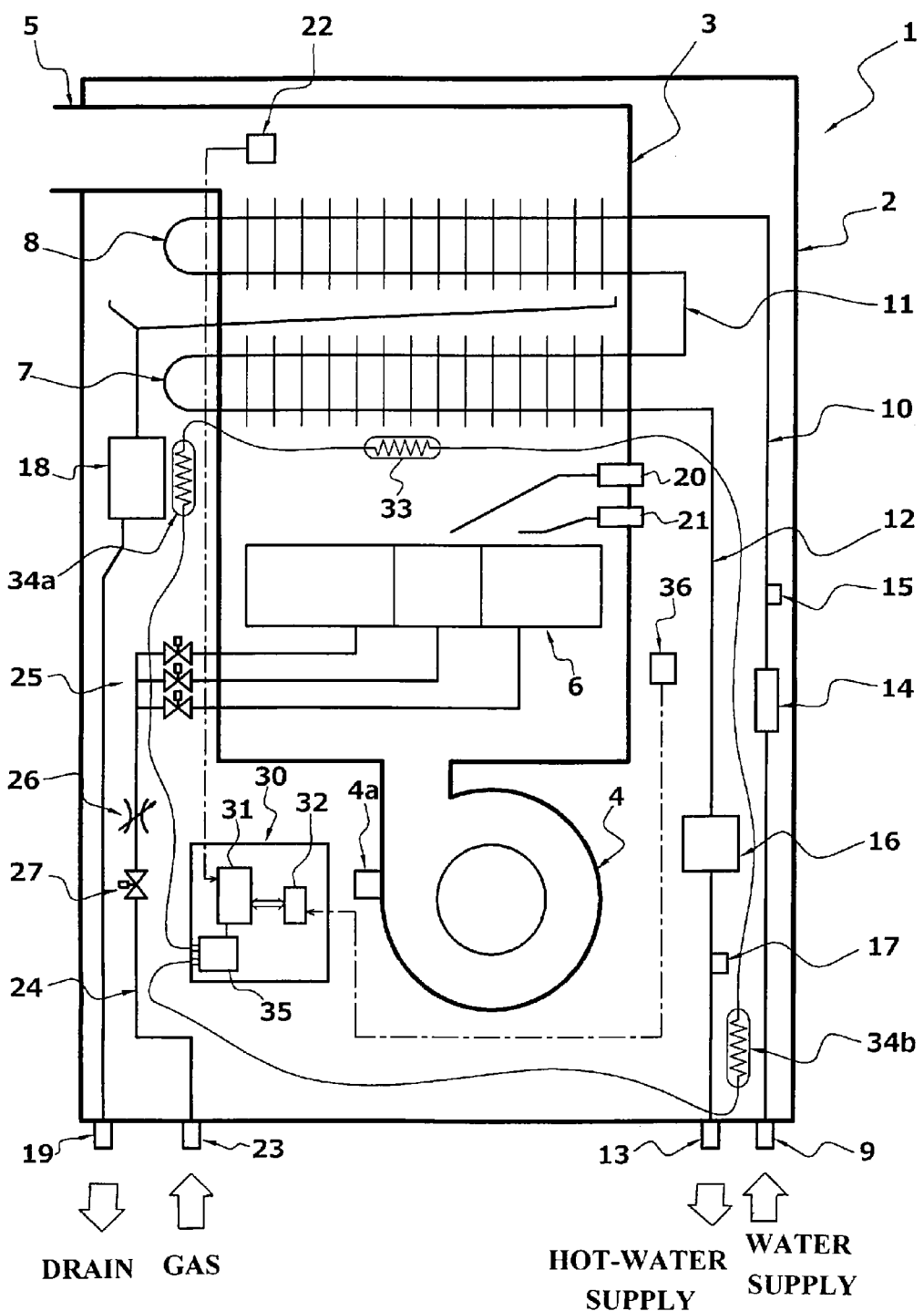
FIG. 1 is a general configuration diagram schematically illustrating a water heater according to an embodiment of the present invention.

Hereinafter, preferred embodiments of the present invention will be described with reference to the drawing figures.

Referring to FIG. 1, there is shown a water heater 1 according to an embodiment of the present invention. The water heater 1 is of the high-efficiency type and is outdoor equipment. The water heater 1 has a housing 2 in which is contained a combustion casing 3. In the combustion casing 3, there is disposed at its upstream-most position (the lowermost part in the example shown in the figure) an air supply fan 4. Provided sequentially in an upstream direction from the air supply fan 4 to an exhaust gas outlet port 5 situated at the downstream-most position are: a combustor 6 composed of a plurality of burners that burn fuel (gas fuel or petroleum-based fuel) upon receipt of combustion air from the air supply fan 4; a primary heat exchanger 7 that heats a flow of water by heat exchange with combustion heat (sensible heat) from the combustor 6; and a secondary heat exchanger 8 that preheats, by recovery of latent heat from the combustion exhaust gas after heating of the primary heat exchanger 7, a flow of water before heating in the primary heat exchanger 7.

Connected to the inlet port of the secondary heat exchanger 8 is the downstream end of a water flowing-in passage 10 into which water such as tap water supplied from a water supply connection port 9 flows. And, after passage through the secondary heat exchanger 8, the water supplied is fed, through the outlet port of the secondary heat exchanger 8 and then through a connection passage 11, to the inlet port of the primary heat exchanger 7. Next, the hot water as a result of heating by heat exchange in the primary heat exchanger 7 is delivered to a hot water flowing-out passage 12, and the hot water thus delivered is supplied from a hot water flowing-out connection port 13 to hot water supply faucets in the kitchen, the wash-basin, the bath room shower et cetera by way of an external hot water supply line.

In addition, the air supply fan 4 has a fan motor (not shown) and a rotation speed sensor 4a for detection of the fan rotating speed. Disposed along the water flowing-in passage 10 are a water volume sensor 14 for detection of the volume of flowing-in water and a flowing-in water temperature sensor 15 for detection of the temperature of flowing-in water. Disposed along the hot water flowing-out passage 12 are a water volume regulating valve 16 for regulation of the volume of flowing-out hot water and a flowing-out hot water temperature sensor 17 for detection of the temperature of flowing-out hot water.

In addition, there is disposed in the interior of the housing 2 a condensate water neutralizer 18. By the condensate water neutralizer 18, it becomes possible that after neutralization of condensate water recovered from the secondary heat exchanger 8 in the combustion casing 3, the neutralized condensate water is discharged to a drain outlet port 19.

Disposed in the vicinity of the upper side of the combustor 6 in the housing 2 are a spark plug 20 and a burner safety device (flame rod) 21. In addition, there is disposed inside the exhaust gas outlet port 5 of the combustion casing 3 an exhaust gas temperature sensor 22. The exhaust gas temperature sensor 22 is provided to monitor the temperature of exhaust gas so that the exhaust gas temperature at the exhaust gas outlet port 5 will not exceed a predefined temperature. In addition, the exhaust gas temperature sensor 22 also serves to monitor whether or not an ambient temperature falls down to such a degree that causes problems with freezing of the inside of the combustion casing 3 or the start-up of combustion by the spark plug 20 due to flowing-in of cold outside air through the exhaust gas outlet port 5 when the combustion operation is brought to a stop, particularly in cold climates.

The combustor 6 is separated into a plurality of combustion regions, and the fuel gas, supplied from a gas supply port 23 by way of a gas supply conduit line 24, is fed to the burners of the combustion regions through capacity-switching gas solenoid valves 25 disposed respectively in the combustion regions. Disposed along the gas supply conduit line 24 are a main gas solenoid valve 27 and a gas proportional valve 26 for regulation of the flow rate of fuel gas.

In addition, a controller unit 30 is disposed inside the housing 2. The controller 30 executes control of the supply of hot water by controlling, based on the parameters detected by the foregoing sensors, the actuators of the water heater 1, namely the air supply fan 4, the water volume regulating valve 16, the spark plug 20, the capacity-switching gas solenoid valve 25, the main gar solenoid valve 27 and the gas proportional valve 26. The controller unit 30, which may have a basic configuration similar to the basic configuration of the controller described in WO 2006/080223, comprises a control substrate on which are mounted a main microprocessor 31 serving as a primary microprocessor which is a relatively high-performance and expensive microprocessor and a sub microprocessor 32 as a secondary microprocessor which is a relatively low-performance and inexpensive microprocessor. And, these microprocessors 31, 32 are communicably connected with each other.

The microprocessors 31, 32 each have a power input port, a plurality of analog signal input ports, one or more digital communication port(s) and a plurality of control signal output ports. In addition, each microprocessor 31, 32 has a built-in A/D convertor section for converting an analog signal input at each analog signal input port into digital data. It should be noted that the number of analog input ports and the number of control signal output ports in the sub microprocessor 32 are less than the number of analog signal input ports and the number of control signal output ports in the main microprocessor 31, respectively.

All of the actuators are connected, either directly or indirectly via their respective driving circuits, to their respective corresponding control signal output ports of the main microprocessor 31 whereby their operations are controlled by the main microprocessor 31. Additionally, in order to enable the sub microprocessor 32 to bring the combustion operation to an urgent stop independently of the main microprocessor 31, it may be arranged such that some of the actuators including the main gas solenoid valve 27 are connected, either directly or indirectly via their respective driving circuits, to their respective corresponding control signal output ports of the sub microprocessor 32.

The rotation speed sensor 4a, the water volume sensor 14, the flowing-in water temperature sensor 15, the flowing-out hot water temperature sensor 17, the burner safety device 21 and the exhaust gas temperature sensor 22 serve to measure various parameters used for control of the supply of hot water, and each sensor measures a parameter and then outputs an analog detection signal according to the parameter. In the present embodiment, the analog detection signals of all of the sensors are connected to their respective corresponding analog input ports of the main microprocessor 31 while on the other hand the analog detection signals of some of the sensors necessary for making a decision to bring the combustion operation to an urgent stop are also parallelly input to their respective corresponding analog signal input ports of the sub microprocessor 32, and these analog detection signals are converted into digital data for use in the hot water supply control program. It may be configured such that the main microprocessor 31 is in charge of controlling, based on the detection values from these sensors, the general hot-water supply operation by executing operational control of each actuator, while on the other hand the sub microprocessor 32 brings the combustion operation to an urgent stop in a stop condition less severe relative to that of the main microprocessor 31, for example, when the temperature of exhaust gas or the temperature of hot water supplied is in an overheated state. The main microprocessor 31 and the sub microprocessor 32 may provide suitable control other than the above.

Further, the water heater 1 of the present embodiment has a function that prevents the occurrence of freezing. In other words, disposed in the water heater 1 are a heater 33 for preventing the occurrence of freezing in the vicinity of the combustion casing 3 due to a backflow of cold air from the exhaust gas outlet port 5, and heaters 34a, 34b for preventing the occurrence of freezing in the inside of the devices other than the combustion casing 3 including the condensate water neutralizer 18, the water flowing-in passage 10 and the hot water flowing-out passage 12. In the example shown in FIG. 1, the heater 33 for preventing the combustion casing 3 from freezing and the heaters 34a, 34b for preventing the other devices from freezing are electrically connected in series, and these heaters are in connection with a power circuit section 35 which is ON/OFF-controlled by the main microprocessor 31.

In addition, an F-point thermistor 36 which is an ambient temperature sensor adapted for measurement of the temperature of the devices other than the combustion casing 3 is disposed in the interior of the housing 2. The analog detection signal of the F-point thermistor 36 is fed only to the analog signal input port of the sub microprocessor 32. That is, the analog detection signal of the F-point thermistor 36 is not connected to any of the analog signal input ports of the main microprocessor 31. It is configured such that when they are in operation, the main microprocessor 31 and the sub microprocessor 32 communicate with each other at intervals of a predetermined period of time in the range from several hundreds of microseconds to several seconds, whereby all of the parameters including the ambient temperature digital data detected by the F-point thermistor 36 which are acquired by the sub microprocessor 32 are transmitted in the form of digital signals to the main microprocessor 31. By such communication, the ambient temperature data as a result of digital conversion of the analog detection signal of the F-point thermistor 36 is sent to the main microprocessor 31 so that based on such data, the main microprocessor 31 executes control to prevent the occurrence of freezing.

Such freeze prevention control by the main microprocessor 31 is optional. For example, if it is detected that either the detection value of the F-point thermistor 36 is less than a predetermined temperature or the detection value of the exhaust gas temperature sensor 22 is less than a predetermined value, then not only the heaters 33, 34a, 34b but also the air supply fan 4 is turned on for a predetermined length of time (for example, 50 minutes). As a result of such arrangement, heat from the casing freeze prevention heater 33 can be delivered to the overlying heat exchangers 7, 8, whereby to prevent the water held in the heat exchangers 7, 8 from freezing.

However, no communication is established between the main microprocessor 31 and the sub microprocessor 32 when power is turned on. Consequently the main microprocessor 31 is being incapable of receiving any ambient temperature digital data corresponding to the detection signal of the F-point thermistor 36. Therefore, the following may take place: the main microprocessor 31 executes control assuming that "0x00" (hexadecimal notation) that is the default of the volatile memory of the main microprocessor 31 is a value of the ambient temperature digital data, and if this default falls within the range of the freeze prevention operation start-up condition, this may result in execution of an unnecessary freeze prevention operation for a predetermined length of time when power is turned on. In order to avoid execution of such an unnecessary freeze operation, it is configured such that an intercommunication normality verifying process for verifying whether the main microprocessor 31 and the sub microprocessor 32 normally communicate with each other when power is turned on. The content of the intercommunication normality verifying process may be optional. For example, the main microprocessor 31 sends given data with a checksum to the sub microprocessor 32. The sub microprocessor 32 checks the checksum, and if normal, then the sub microprocessor 32 sends given data with a checksum to the main microprocessor 31. The main microprocessor 31 checks the predetermined data against the checksum, and if normal, then it can be decided that the intercommunication is normally established. On the other hand, if either the sub microprocessor 32 or the main microprocessor 31 verifies that there is a mismatch with respect to the checksum, then it is decided that the intercommunication is not normally established. And, the user is notified of such an intercommunication error via a remote controller (not shown). And, it is configured such that until it is verified that the intercommunication is established normally, the main microprocessor 31 will not execute any freeze prevention control based on the detection value (ambient temperature digital data) of the F-point thermistor 36, but will execute, based only on the detection value from the exhaust gas temperature sensor 22, ON/OFF control on the heaters 33, 34a, 34b.

In addition, in order to prevent an erroneous decision regarding the abnormal communication, a predetermined length of time for verifying whether the intercommunication is abnormal (for example, 5 minutes), and it is preferred that if the decision that the intercommunication is normal is not yet made even after the intercommunication normality verifying process is carried out repeatedly before the verification time has elapsed, it is finally decided that the intercommunication is abnormal. In this case, no ambient temperature digital data is sent from the sub microprocessor 32 until it is decided that the intercommunication is definitely abnormal, as a result of which no freeze prevention control based on the data is executed, This, however, produces the possibility that the water flowing-in passage 10 and the hot water flowing-out passage 12 may become frozen and damaged. To cope with this, in the case that the aforesaid verification time for deciding whether the intercommunication is abnormal is set, preferably it is configured such that there is provided inside or outside the main microprocessor 31 a non-volatile memory readable and writable by the main microprocessor 31, and the ambient temperature digital data sent from the sub microprocessor 32 to the main microprocessor 31 is stored and held in the non-volatile memory by the main microprocessor 31. This makes it possible for the main microprocessor 31 to make reference to the stored ambient temperature digital data acquired when the intercommunication was normal, even during an elapse of the verification time taken for intercommunication abnormality decision, and it is preferred that before the ambient temperature digital data is actually received from the sub microprocessor 32, a freeze prevention control operation is carried on the heaters 33, 34a, 34b based on the ambient temperature digital data acquired when the intercommunication was normal. And, upon receipt of the ambient temperature digital data from the sub microprocessor 32 after establishment of the intercommunication, the data stored in the no-volatile memory is updated accordingly.

Furthermore, if it is definitely verified that the intercommunication is in an abnormal state, the detection value of the F-point thermistor 36 will remain unknown for a long time. Therefore, it can be configured such that the heaters 33, 34a, 34b are forcibly turned on.

It should be noted that the present invention is not limited to the embodiment described above. Therefore, it is optional that the present invention may be modified in design. For example, the foregoing embodiment is configured such that the heater 33 for freeze prevention of the combustion casing 3 and the heaters 34a, 34b for freeze prevention of the other devices are connected in series so that the freeze prevention operation is carried out if either the condition for freeze prevention of the inside of the combustion casing 3 or the condition for freeze prevention of the other devices is held. Alternatively, it is possible that by the arrangement that the systems for power supply to the respective heaters are provided independently, whereby each heater is ON-OFF controlled based on its respective own condition. In addition, it is arranged such that in the foregoing embodiment, the casing freeze prevention condition is judged based on the exhaust gas temperature sensor 22. Alternatively, however, it is possible that the casing freeze prevention condition may be judged based on the flowing-out hot water temperature sensor 17.

In addition, the communication normality verifying process is carried out by such a procedure: the main microprocessor's 31 transmission=>the sub microprocessor's 32 reception=>the sub microprocessor's 32 transmission=>the main microprocessor's 31 reception. Alternatively, it may be arranged such that the main microprocessor 31 makes a decision whether the intercommunication is normal just by the following procedure: the sub microprocessor's 32 transmission=>the main microprocessor's 31 reception.

In addition, the foregoing embodiment is configured such that in the case that the verification time taken for intercommunication abnormality decision is set, the main microprocessor 31 directs the non-volatile memory to store and hold the ambient temperature data sent from the sub microprocessor 32. Alternatively, instead of such a non-volatile memory, RAM may be employed.

Furthermore, various communication formats may be employed as a communication format used at the time of transmission of a signal relating to the digital data from the sub microprocessor 32 as a secondary microprocessor to the main microprocessor 31 as a primary microprocessor through communication with the main microprocessor 31.

What is claimed is:

1. A control apparatus for a water heater, said water-heater control apparatus comprising:
   a housing;
   a plurality of sensors for measurement of various parameters for operational control on said water heater; and
   a controller disposed inside the housing for controlling said water heater upon analog detection signals output from said plural sensors, said controller comprising a main microprocessor with analog signal input ports and a sub-microprocessor with at least one analog signal input port, the sub-microprocessor being intercommunicable with said main microprocessor;
   wherein at least one of said plurality of sensors serves to measure a non-immediate responsive parameter that is not in need of immediate response by said controller;
   wherein said at least one sensor adapted for measurement of said non-immediate responsive parameter outputs said analog detection signal which is not input to any analog signal input ports of said main microprocessor, but is input only to said analog signal input port of said sub-microprocessor;
   wherein the others of said plurality of sensors output said analog detection signals which are input at least to said analog signal input ports of said main microprocessor;
   wherein said sub-microprocessor is configured to convert said analog detection signal input only to said analog signal input port thereof into digital data and to periodically transmit said digital data to said main microprocessor through communication with said main microprocessor, said main microprocessor having a predetermined control operation carried out based on said periodically transmitted digital data, making it possible to reduce the number of analog signal input ports of the primary microprocessor, which allows a less costly primary microprocessor that is employed thereby achieving reduction in product cost; and
   wherein said sub-microprocessor selectively brings a combustion operation to an urgent stop independently of said main microprocessor.

2. The water-heater control apparatus as set forth in claim 1,
   wherein said main microprocessor and said sub-microprocessor are configured to perform an intercommunication normality verifying process at least when power is turned on which verify whether the intercommunication between said main microprocessor and said sub-microprocessor is normal;
   said sub-microprocessor is configured to start transmission of said digital data from the sub-microprocessor to said main microprocessor after said intercommunication is verified to be normal by said intercommunication normality verifying process; and
   said main microprocessor is configured to control a predetermined operation based on said digital data received through communication with said sub-microprocessor.

3. The water-heater control apparatus as set forth in claim 1, wherein said at least one sensor adapted for measurement of said non-immediate responsive parameter is an ambient temperature sensor.

4. The water-heater control apparatus as set forth in claim 1, wherein said main microprocessor is configured to control a predetermined hot water supply operation and a predetermined freeze prevention operation;
   at least some of said sensors serve to measure immediate responsive parameters that are in need of immediate response by said controller for controlling said hot water supply operation;

all of said analog detection signals from said some sensors are input into said analog signal input ports of said main microprocessor; and said non-immediate responsive parameter is used for controlling said freeze prevention operation.

5. A water heater comprising a water-heater control apparatus as set forth in claim 1.

6. A water heater comprising a water-heater control apparatus as set forth in claim 2.

7. A water heater comprising a water-heater control apparatus as set forth in claim 3.

8. A water heater comprising a water-heater control apparatus as set forth in claim 4.

9. The water-heater control apparatus as set forth in claim 1, wherein the sub-microprocessor brings the combustion operation to the urgent stop by actuating a main gas solenoid valve.

10. A control apparatus for a water heater, said water-heater control apparatus comprising:

a housing;

a plurality of sensors for measurement of various parameters for operational control on said water heater; and a controller disposed inside the housing for controlling said water heater upon analog detection signals output from said plural sensors, said controller comprising a main microprocessor with analog signal input ports and a sub-microprocessor with at least one analog signal input port, the sub-microprocessor being intercommunicable with said main microprocessor;

wherein at least one of said plurality of sensors serves to measure a non-immediate responsive parameter that is not in need of immediate response by said controller;

wherein said at least one sensor adapted for measurement of said non-immediate responsive parameter outputs said analog detection signal which is not input to any analog signal input ports of said main microprocessor, but is input only to said analog signal input port of said sub-microprocessor;

wherein the others of said plurality of sensors output said analog detection signals which are input at least to said analog signal input ports of said main microprocessor;

wherein said sub-microprocessor is configured to convert said analog detection signal input only to said analog signal input port thereof into digital data and to periodically transmit said digital data to said main microprocessor through communication with said main microprocessor, said main microprocessor having a predetermined control operation carried out based on said periodically transmitted digital data, making it possible to reduce the number of analog signal input ports of the primary microprocessor, which allows a less costly primary microprocessor that is employed thereby achieving reduction in product cost;

wherein said at least one sensor adapted for measurement of said non-immediate responsive parameter is an ambient temperature sensor;

wherein said main microprocessor is configured to control a predetermined hot water supply operation and a predetermined freeze prevention operation;

wherein at least some of said sensors serve to measure immediate responsive parameters that are in need of immediate response by said controller for controlling said hot water supply operation;

wherein all of said analog detection signals from said some sensors are input into said analog signal input ports of said main microprocessor; and wherein said non-immediate responsive parameter is used for controlling said freeze prevention operation; and wherein said sub-microprocessor selectively brings a combustion operation to an urgent stop independently of said main microprocessor.

11. The water-heater control apparatus as set forth in claim 10, wherein the sub-microprocessor brings the combustion operation to the urgent stop by actuating a main gas solenoid valve.

* * * * *